United States Patent
Chu

(10) Patent No.: US 12,126,044 B2
(45) Date of Patent: Oct. 22, 2024

(54) SEPARATORS FOR ELECTROCHEMICAL CELLS AND ELECTROCHEMICAL CELLS INCLUDING THE SAME

(71) Applicant: GM GLOBAL TECHNOLOGY OPERATIONS LLC, Detroit, MI (US)

(72) Inventor: Seung-Woo Chu, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 200 days.

(21) Appl. No.: 17/316,547

(22) Filed: May 10, 2021

(65) Prior Publication Data
US 2022/0359949 A1 Nov. 10, 2022

(51) Int. Cl.
| | |
|---|---|
| H01M 50/434 | (2021.01) |
| H01M 4/02 | (2006.01) |
| H01M 4/505 | (2010.01) |
| H01M 4/525 | (2010.01) |
| H01M 4/62 | (2006.01) |
| H01M 10/0569 | (2010.01) |
| H01M 50/417 | (2021.01) |

(52) U.S. Cl.
CPC ......... H01M 50/434 (2021.01); H01M 4/505 (2013.01); H01M 4/525 (2013.01); H01M 4/622 (2013.01); H01M 10/0569 (2013.01); H01M 50/417 (2021.01); H01M 2004/028 (2013.01)

(58) Field of Classification Search
CPC .......................... H01M 50/434; H01M 50/49
See application file for complete search history.

(56) References Cited

U.S. PATENT DOCUMENTS

| | | | |
|---|---|---|---|
| 2007/0122716 A1* | 5/2007 | Seo ...................... | H01M 10/052 429/251 |
| 2011/0200863 A1* | 8/2011 | Xiao .................... | H01M 50/417 427/536 |
| 2014/0322586 A1* | 10/2014 | Lee ...................... | H01M 50/446 429/144 |
| 2019/0127234 A1* | 5/2019 | Aizenberg ............... | B01J 20/08 |

(Continued)

FOREIGN PATENT DOCUMENTS

| | | |
|---|---|---|
| CN | 104205415 A | 12/2014 |
| CN | 115332724 A | 11/2022 |

(Continued)

OTHER PUBLICATIONS

Kim, Jung-Hwan, et al. "Inverse opal-inspired, nanoscaffold battery separators: A new membrane opportunity for high-performance energy storage systems." Nano letters 14.8 (2014): 4438-4448. (Year: 2014).*

Xie, Yong, et al. "Enhancement on the wettability of lithium battery separator toward nonaqueous electrolytes." Journal of Membrane Science 503 (2016): 25-30. (Year: 2016).*

(Continued)

*Primary Examiner* — Christina Chern
*Assistant Examiner* — Kayla Elaine Clary
(74) *Attorney, Agent, or Firm* — Harness, Dickey & Pierce, P.L.C.

(57) ABSTRACT

A separator for a lithium-containing electrochemical cell is provided herein. The separator includes a porous substrate having a first side and an opposing second side and a coating layer disposed adjacent to at least the first side of the porous substrate. The coating layer includes three-dimensionally (3D) ordered porous ceramic particles. An electrochemical cell including such a separator is also provided herein. The electrochemical cell may or may not include a negative electrode.

18 Claims, 2 Drawing Sheets

(56) References Cited

U.S. PATENT DOCUMENTS

| | | |
|---|---|---|
| 2019/0319242 A1 | 10/2019 | Dadheech et al. |
| 2020/0403204 A1 | 12/2020 | Xiao et al. |
| 2022/0376357 A1 | 11/2022 | Gao et al. |

FOREIGN PATENT DOCUMENTS

| | | |
|---|---|---|
| DE | 102022107901 A1 | 11/2022 |
| KR | 20090108317 A | 10/2009 |

OTHER PUBLICATIONS

Jiang, Xiaoyu, et al. "Novel ceramic-grafted separator with highly thermal stability for safe lithium-ion batteries." ACS Applied Materials & Interfaces 9.31 (2017): 25970-25975. (Year: 2017).*

Shuvo, Mohammad Arif Ishtiaque, et al. "Nanowire-graphene hybrids for lithium-ion-battery." Behavior and Mechanics of Multifunctional Materials and Composites 2013. vol. 8689. SPIE, 2013. (Year: 2013).*

"Copper: Korea's KCFT begins mass production of 4-micron copper foil for EV batteries," Oct. 14, 2019; https://roskill.com/news/copper-koreas-kcft-begins-mass-production-of-4-micron-copper-foil-for-ev-batteries/.

"Three Dimensionally Ordered Microstructure of Polycrystalline Zirconia Ceramics with Micro-Porosity," Myung Chul Chang, Journal of the Korean Ceramic Society, vol. 53, No. 1, pp. 50-55, 2016.

"High rate and stable cycling of lithium metal anode," Jiangfeng Qian et al., Nature Communications; pub'd Feb. 20, 2015, http://www.nature.com/naturecommunications.

"Review—Practical Challenges Hindering the Development of Solid State Li Ion Batteries," Kian Kerman et al., Journal of The Electrochemical Society, 164 (7) A1731-A1744; pub'd Jun. 9, 2017.

"Advances and issues in developing salt-concentrated battery electrolytes," Yuki Yamada et al., Nature Energy vol. 4, pp. 269-280, pub'd Mar. 11, 2019 (Abstract Only).

First Office Action for Chinese Patent Application No. 202210506581.0 issued on Jun. 25, 2023, with correspondence from China Patent Agent (H.K.) Ltd. summarizing Office Action; 11 pages.

* cited by examiner

SEPARATORS FOR ELECTROCHEMICAL CELLS AND ELECTROCHEMICAL CELLS INCLUDING THE SAME

FIELD

The present disclosure relates generally to lithium-containing electrochemical cells and, more specifically, to separators for lithium-containing electrochemical cells.

BACKGROUND

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a relatively high concentration of intercalated lithium, which is oxidized into lithium ions and electrons. The lithium ions travel from the negative electrode (anode) to the positive electrode (cathode), for example, through the ionically conductive electrolyte solution contained within the pores of an interposed porous separator. At the same time, the electrons pass through the external circuit from the negative electrode to the positive electrode. The lithium ions may be assimilated into the material of the positive electrode by an electrochemical reduction reaction. The battery may be recharged after a partial or full discharge of its available capacity by an external power source, which reverses the electrochemical reactions that transpired during discharge.

During cycling, degradation of the active materials (e.g., negative electrode, positive electrode, and electrolyte) can occur as well as metal lithium plating and the formation of lithium dendrites, surface deposits of lithium on the negative electrode. Additionally, a passivation layer, also known as a solid electrolyte interphase (SEI) layer, can form on a surface of a lithium-containing negative electrode from decomposition products of the electrolyte. This degradation of active materials and formation of dendrites and an SEI layer can result in low Coulombic efficiency, poor cycle performance, and potential safety issues for the battery.

It would be desirable to develop materials for lithium ion batteries, for use in high energy and high power lithium ion batteries, which overcome the current shortcomings that prevent their widespread commercial use. Accordingly, it would be desirable to develop materials for lithium ion batteries, particularly for separators for lithium-ion containing batteries, which, for example, improve ionic transport and promote smooth lithium depositions and thereby increase Coulombic efficiency, rate performance, and fast charge capability.

SUMMARY

This section provides a general summary of the disclosure and is not a comprehensive disclosure of its full scope or all of its features.

In certain aspects, the present disclosure provides a separator for a lithium-containing electrochemical cell. The separator includes a porous substrate having a first side and an opposing second side and a coating layer disposed adjacent to at least the first side of the porous substrate. The coating layer includes three-dimensionally (3D) ordered porous ceramic particles.

The coating layer may have a thickness of less than or equal to about 10 μm, for example, about 2 μm to about 8 μm. Additionally or alternatively, the 3D ordered porous ceramic particles may have an average pore size diameter of less than about 500 nm, for example, about 100 nm to about 200 nm.

The 3D ordered porous ceramic particles may include $Al_2O_3$, $ZrO_2$, γ-AlO(OH), MgO, $Mg(OH)_2$, or a combination thereof.

The coating layer further may further include a polymeric binder or the coating layer may not include a binder.

The porous substrate may include a composite material, a polymeric material, a nonwoven material, or a combination thereof.

The polymeric material may include a polyolefin.

In yet other aspects, the present disclosure provides an electrochemical cell. The electrochemical cell includes a positive electrode, a first current collector, wherein the positive electrode is spaced apart from the first current collector, a separator, and a liquid electrolyte infiltrating one or more of the positive electrode and the separator. The positive electrode includes first electroactive material. The separator includes a porous substrate having a first side and an opposing second side and a coating layer disposed adjacent to at least the first side of the porous substrate. The coating layer includes three-dimensionally (3D) ordered porous ceramic particles. The separator is disposed between confronting surfaces of the positive electrode and the first current collector and the coating layer is disposed adjacent to the first current collector;

The coating layer may have a thickness of less than or equal to about 10 μm, for example, about 2 μm to about 8 μm. Additionally or alternatively, the 3D ordered porous ceramic particles may have an average pore size diameter of less than about 500 nm, for example, about 100 nm to about 200 nm.

The 3D ordered porous ceramic particles may include $Al_2O_3$, $ZrO_2$, γ-AlO(OH), MgO, $Mg(OH)_2$, or a combination thereof.

The coating layer further may further include a polymeric binder or the coating layer may not include a binder.

The porous substrate may include a composite material, a polymeric material, a nonwoven material, or a combination thereof.

The polymeric material may include a polyolefin.

The electrolyte comprises a lithium salt and a solvent, wherein the lithium salt concentration is greater than or equal to about 2 M, for example, about 3 M to about 4 M.

The first electroactive material may be selected from the group consisting of $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0 < x < 0.2$, $y < 0.2$, and M is Al, Mg, or Ti; $LiFePO_4$, $LiMn_{2-x}Fe_xPO_4$, where $0 < x < 0.3$; $LiNiCoAlO_2$; $LiMPO_4$, where M is at least one of Fe, Ni, Co, and Mn; $Li(Ni_xM-n_yCo_zAl_p)PO_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2Fe_xM_{1-x}PO_4$, where M is Mn and/or Ni, $0 \leq x \leq 1$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur, and a combination thereof.

A negative electrode may not be present in the electrochemical cell. Alternatively, the electrochemical cell may further include a negative electrode comprising a second electroactive material. The negative electrode may be present between confronting surfaces of the coating layer of the separator and the first current collector.

The second electroactive material may include lithium, a lithium silicon alloy, a lithium aluminum alloy, a lithium indium alloy, a lithium tin alloy, graphite, activated carbon, carbon black, hard carbon, soft carbon, graphene, silicon, tin oxide, aluminum, indium, zinc, germanium, silicon oxide, titanium oxide, lithium titanate, or a combination thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
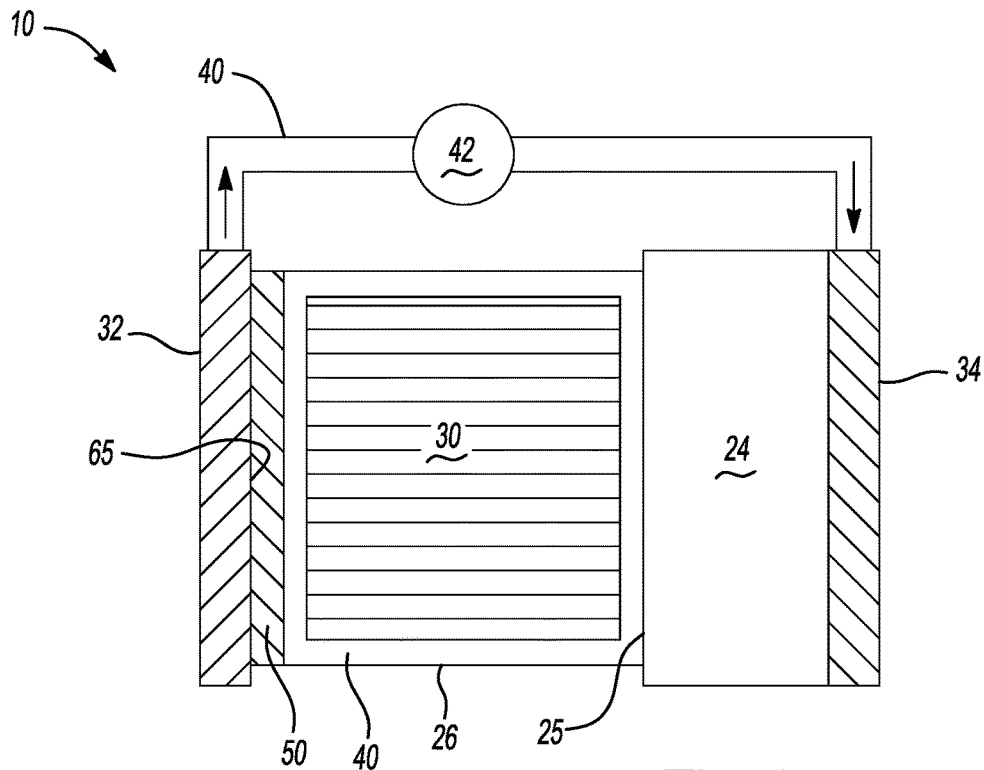
FIG. 1 is a schematic of an exemplary electrochemical battery cell.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," "attached to," or "coupled to" another element or layer, it may be directly on, engaged, connected, attached or coupled to the other component, element, or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

I. Electrochemical Cell

Lithium-containing electrochemical cells typically include a negative electrode, a positive electrode, an electrolyte for conducting lithium ions between the negative and positive electrodes, and a porous separator between the negative electrode and the positive electrode to physically separate and electrically insulate the electrodes from each other while permitting free ion flow. When assembled in an electrochemical cell, for example, in a lithium-ion battery, the porous separator is infiltrated with a liquid electrolyte. The present disclosure pertains to improved separators for lithium-containing electrochemical cells (e.g., lithium ion batteries). It has been discovered that inclusion of a coating layer present on at least one surface of a porous separator, wherein the coating layer includes three-dimensionally (3D) ordered porous ceramic particles, can advantageously allow for substantially uniform or homogenous distribution of lithium ions during cycling. This uniform or homogenous distribution of lithium ions can prevent lithium dendrite formation and improve the overall performance of the electrochemical cell. It has further been discovered that this substantially uniform or homogenous distribution of lithium ions can be achieved at an interface between the coating layer and a surface of negative electrode as well as at an interface between the coating layer and a surface of a current collector. Thus, an electrochemical cell including a separator with such a coating layer can be formed with or without a negative electrode.

An electrochemical cell for use in batteries, for example, a lithium ion battery, or as capacitors is provided herein. For example, an exemplary and schematic illustration of an electrochemical cell (also referred to as the lithium ion battery or battery) 10 is shown in FIG. 1. Electrochemical cell 10 includes a first current collector 32, a positive electrode 24 (also referred to as a positive electrode layer 24), a second current collector 34 (also referred to as a positive electrode current collector 34) may be positioned at or near the positive electrode 24, and a separator 26 disposed between the positive electrode 24 and the first current collector 32. The separator 26 may include a coating layer 50 further described below. The space between (e.g., the separator 26) the first current collector 32 and positive electrode 24 can be filled with the electrolyte 30. If there are pores inside the positive electrode 24, the pores may also be filled with the electrolyte 30. The electrolyte 30 can impregnate, infiltrate, or wet the surfaces of and fills the pores of each of the positive electrode 24 and the porous separator 26. As depicted in FIG. 1, the electrochemical cell 10 does not include a negative electrode or negative electrode layer.

Figure 2:
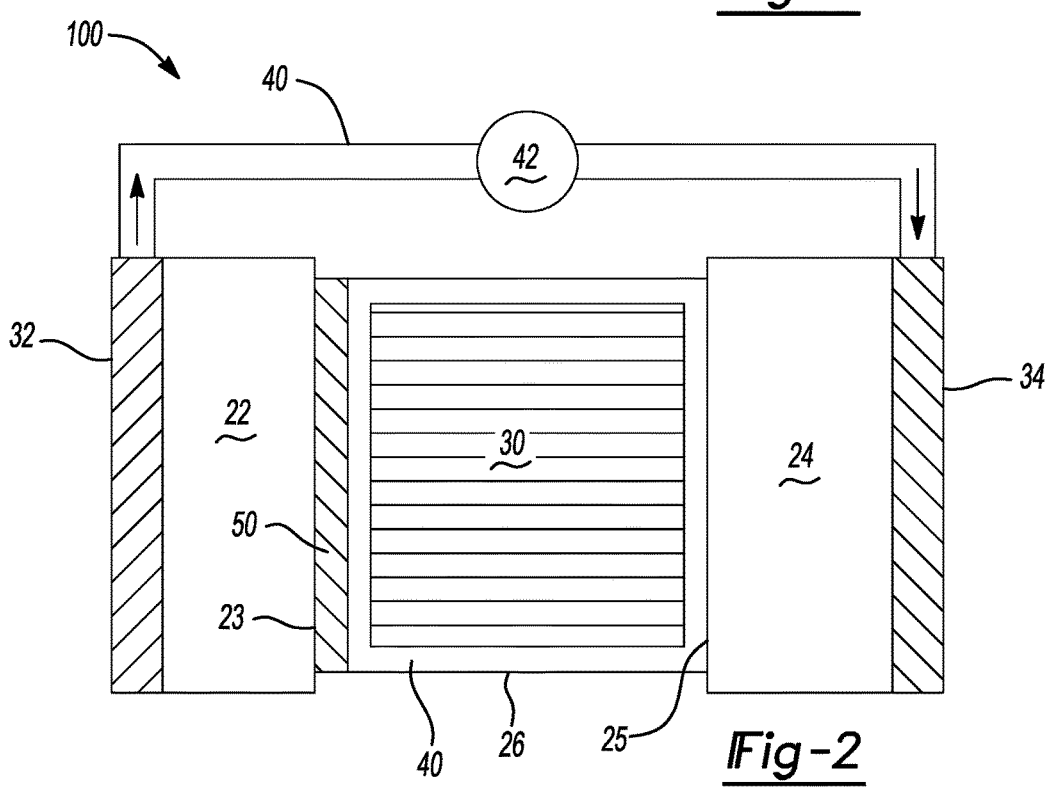
FIG. 2 is a schematic of another exemplary electrochemical battery cell.

Alternatively, as depicted in FIG. 2, an electrochemical cell 100 (also referred to as the lithium ion battery or battery) is provided herein, which may include a negative electrode 22 (also referred to as a negative electrode layer 22), a positive electrode 24 (also referred to as a positive electrode layer 24), and a separator 26 disposed between the positive electrode 24 and negative electrode 22. In such embodiments, the first current collector 32 may be the negative electrode current collector 32 positioned at or near the negative electrode 22. The separator 26 may also include a coating layer 50 further described below. The space between (e.g., the separator 26) the negative electrode 22 and positive electrode 24 can be filled with the electrolyte 30. If there are pores inside the negative electrode 22 and positive electrode 24, the pores may also be filled with the electrolyte 30. The electrolyte 30 can impregnate, infiltrate, or wet the surfaces of and fills the pores of each of the negative electrode 22, the positive electrode 24, and the porous separator 26.

The first current collector 32 and positive electrode current collector 34 respectively collect and move free electrons to and from an external circuit 40. An interruptible external circuit 40 and load device 42 connects the first current collector 32 and the positive electrode 24 (through its current collector 34) or the negative electrode 22 (through its current collector 32) and the positive electrode 24 (through its current collector 34). Each of the negative electrode 22, if present, the positive electrode 24, and the separator 26 may further comprise the electrolyte 30 capable of conducting lithium ions. The separator 26 operates as both an electrical insulator and a mechanical support, by being sandwiched between the first current collector 32 and the positive electrode 24 or between the negative electrode 22 and the positive electrode 24 to prevent physical contact and thus, the occurrence of a short circuit. The separator 26, in addition to providing a physical barrier between the first current collector 32 and the positive electrode 24 or the between the electrode 22, 24 can provide a minimal resistance path for internal passage of lithium ions (and related anions) for facilitating functioning of the batteries 10, 100. The separator 26 also contains the electrolyte solution in a network of open pores during the cycling of lithium ions, to facilitate functioning of the batteries 10, 100.

The batteries 10, 100 can generate an electric current during discharge by way of reversible electrochemical reactions that occur when the external circuit 40 is closed (to connect the first current collector 32 and the positive electrode 24 or to connect the negative electrode 22 and the positive electrode 24) when the first current collector 32 or the negative electrode 22 contains a relatively greater quantity of inserted lithium. In battery 10, the chemical potential difference between the positive electrode 24 and the first current collector 22 drives electrons produced by the oxidation of deposited lithium, for example, metallic lithium, at the first current collector 32 through the external circuit 40 toward the positive electrode 24. Alternatively, in battery 100, the chemical potential difference between the positive electrode 24 and the negative electrode 22 drives electrons produced by the oxidation of inserted lithium at the negative electrode 22 through the external circuit 40 toward the positive electrode 24. Lithium ions, which are also produced at the first current collector 32 or the negative electrode 22, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 40 can be harnessed and directed through the load device 42 until the inserted lithium in the first current collector 32 or in the negative electrode 22 is depleted and the capacity of the lithium ion battery 10 or lithium ion battery 100 is diminished.

The lithium ion batteries 10, 100 can be charged or re-powered/re-energized at any time by connecting an external power source to the lithium ion batteries 10, 100 to reverse the electrochemical reactions that occur during battery discharge. The connection of an external power source to the lithium ion batteries 10, 100 compels the otherwise non-spontaneous oxidation of intercalated lithium at the positive electrode 24 to produce electrons and lithium ions. In battery 10, the electrons, which flow back towards the first current collector 32 through the external circuit 40, and the lithium ions, which are carried by the electrolyte 30 across the separator 26 back towards the first current collector 32, reunite at the first current collector 32 and replenish it with deposited lithium, for example, as metallic lithium deposited on the first current collector 32, for consumption during the next battery discharge event. In battery 100, the electrons, which flow back towards the negative electrode 22 through the external circuit 40, and the lithium ions, which are carried by the electrolyte 30 across the separator 26 back towards the negative electrode 22, reunite at the negative electrode 22 and replenish it with inserted lithium for consumption during the next battery discharge event. As such, a complete discharging event followed by a complete charging event is considered to be a cycle, where lithium ions are cycled between the positive electrode 24 and the first current collector 32 or between the positive electrode 24 and the negative electrode 22. The external power source that may be used to charge the lithium ion batteries 10, 100 may vary depending on the size, construction, and particular end-use of the lithium ion batteries 10, 100. Some notable and exemplary external power sources include, but are not limited to, an AC wall outlet and a motor vehicle alternator.

In many battery configurations, each of the first current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package. The first current collector 32 and positive electrode current collector 34 respectively collect and move free electrons to and from an external circuit 40.

Furthermore, the batteries 10, 100 can include a variety of other components that while not depicted here are nonetheless known to those of skill in the art. For instance, the lithium ion batteries 10, 100 may include a casing, gaskets, terminal caps, tabs, battery terminals, and any other conventional components or materials that may be situated within the batteries 10, 100, including between or around the negative electrode 22, the positive electrode 24, and/or the separator 26, by way of non-limiting example. The battery 10 shown in FIG. 1 and the battery 100 shown in FIG. 2 both include a liquid electrolyte 30 and show representative concepts of battery operation.

As noted above, the size and shape of the lithium ion batteries 10, 100 may vary depending on the particular application for which it is designed. Battery-powered vehicles and hand-held consumer electronic devices, for example, are two examples where the batteries 10, 100 would most likely be designed to different size, capacity, and power-output specifications. The batteries 10, 100 may also be connected in series or parallel with other similar lithium ion cells or batteries to produce a greater voltage output and power density if it is required by the load device 42.

Accordingly, the batteries 10, 100 can generate electric current to a load device 42 that can be operatively connected to the external circuit 40. The load device 42 may be powered fully or partially by the electric current passing through the external circuit 40 when the lithium ion batteries 10, 100 are discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the batteries 10, 100 for purposes of storing energy.

The present technology pertains to improved electrochemical cells, especially lithium-ion batteries. In various instances, such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example.

A. Separator

Figure 3:
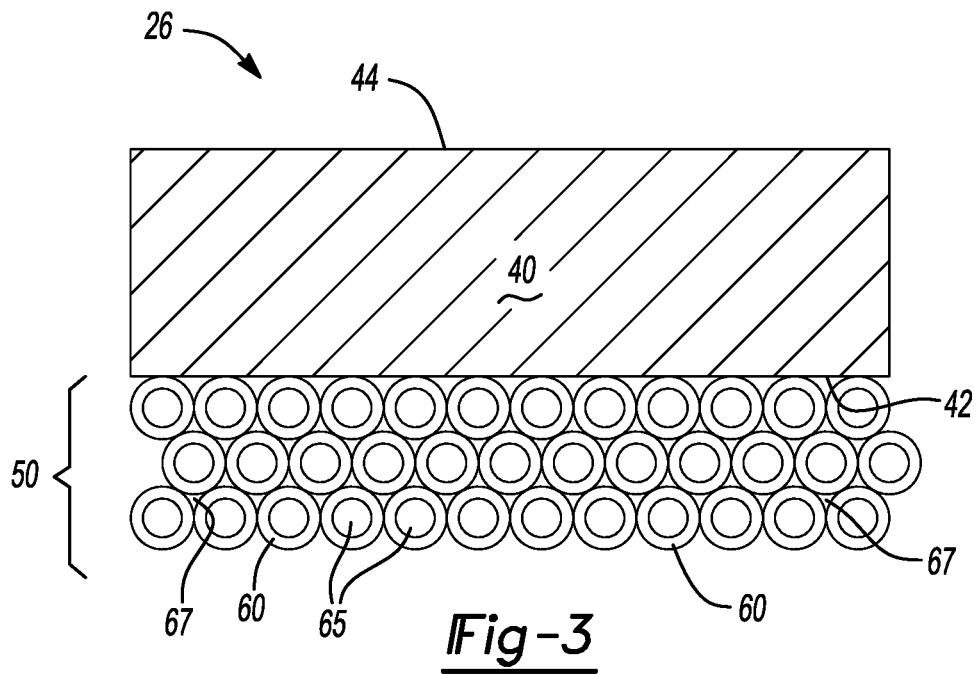
FIG. 3 is a cross-sectional view of an exemplary separator including porous substrate and a coating layer for an electrochemical battery cell.
Figure 4:
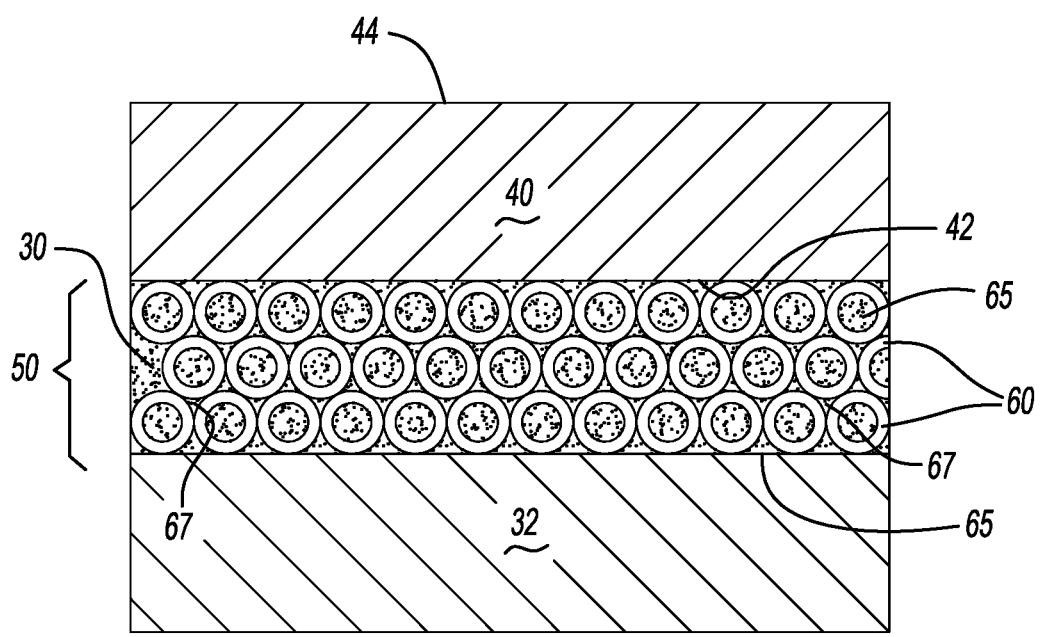
FIG. 4 is a cross-sectional view of an exemplary separator including porous substrate and a coating layer adjacent to a first current collector.

A porous separator (e.g., separator 26) for a lithium-containing electrochemical cell is provided herein. The porous separator may include a porous substrate and a coating layer comprising three-dimensionally (3D) ordered porous ceramic particles. For example, as shown in FIG. 3, the separator 26 may include a porous substrate 40 having a first side 42 (or first surface 42) and an opposing second side 44 (or second surface 44). A coating layer 50 including 3D ordered porous ceramic particles 60 be present only a first side 42 the substrate 40. Alternatively, although not shown, the coating layer 50 including 3D ordered porous ceramic particles 60 be present only on a second side 44 of the substrate 40 or the coating layer 50 may be present on both sides 42, 44 of the substrate 40. In assembly, for example, as depicted in FIG. 1 and FIG. 4, the separator 26 may be disposed between confronting surfaces of the positive electrode 24 and the first current collector 32. In such embodiments, the coating layer 50 faces toward, is disposed adjacent to, and/or presses against a first face 65 of the first current collector 32. In an alternative assembly, for example, as depicted in FIG. 2, the separator 26 may be disposed between confronting surfaces of the positive electrode 24 and the negative electrode 22. In such embodiments, the coating layer 50 faces toward, is disposed adjacent to, and/or presses against a second face 23 of the negative electrode 22.

Additionally or alternatively, the second side 44 of the substrate 42 may be coated with coating layer 50 (not shown), and the coating layer 50 may face toward, be adjacent to and/or presses against a third face 25 of the positive electrode 24. In such embodiments, the first side 42 of the substrate 40 may or may not include a coating layer 50 present thereon.

In any embodiment, a coating layer 50 may be continuously or discontinuously formed on the first and/or second sides 42, 44 of the substrate 40. For example, a coating layer 50 may be formed on the first side 42 of the substrate such that the coating layer 50 covers an entire surface area or only a portion of the surface area on the first side 42 of the substrate 40. Likewise, a coating layer 50 may be formed on the second side 44 of the substrate 40 such that the coating layer 50 covers an entire surface area or only a portion of the surface area on the second side 44 of the substrate 40. The coating layer 50 may extend over the first and second sides 42, 44 of the substrate 40 and, in some instances, may extend partway into the micropores of the substrate 40.

In any embodiment, the porous substrate 40 may comprise any organic or inorganic material that can physically separate and electrically insulate a positive and negative electrode from each other while permitting the free flow of lithium ions therebetween. For example, the substrate 40 may comprise composite material or a nonwoven material, e.g., a manufactured sheet, web, or matt of directionally or randomly oriented fibers, including but not limited to cotton, nylon, polyesters, glass and a combination thereof. As another example, the substrate 40 may comprise a porous (e.g., microporous) polymeric material, e.g., a microporous polyolefin-based membrane or film. The porous substrate 40 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In some embodiments, the porous substrate 40 may comprise a laminate of one or more polymeric materials, such as a laminate of PE and PP. Commercially available polyolefin porous separator substrates can include CELGARD® 2500 (a monolayer polypropylene separator) and CELGARD® 2325 (a trilayer polypropylene/polyethylene/polypropylene separator) available from Celgard LLC.

In other aspects, the substrate 40 may be a fibrous membrane having an abundance of pores extending between the opposing surfaces and may have an average thickness of less than a millimeter, for example. As another example, however, multiple discrete layers of similar or dissimilar polyolefins may be assembled to form the substrate 40. The substrate 40 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the substrate 40 as a fibrous layer to help provide the substrate 40 with appropriate structural and porosity characteristics.

The substrate 40 may have a thickness, measured between the first and second sides 42, 44 of the substrate 40, in the range of about 4 µm to about 25 µm.

In some embodiments, the coating layer 50 may have thicknesses of less than or equal to about 25 µm, less than or equal to about 20 µm, less than or equal to about 10 µm, less than or equal to about 8 µm, less than or equal to about 5 µm, less than or equal to about 2 µm, less than or equal to about 1 µm, or about 50 nm. Additionally or alternatively, the coating layer 50 may have thicknesses in the range of about 50 nm to about 25 µm, about 50 nm to about 20 µm, about 50 nm to about 10 µm, about 50 nm to about 8 µm, about 2 µm to about 20 µm, about 2 µm to about 10 µm, about 2 µm to about 8 µm, or about 2 µm to about 5 µm. As compared to the thickness of the substrate 40, the thickness of coating layer 50 may be less than that of the substrate 40. For example, the thickness of coating layer 50 may be 50% or less than the thickness of the substrate 40.

As used herein, the 3D ordered ceramics particles in the coating layer 50 encompasses a structure including a porous body having monodispersed ceramic particles, which may be spherical in shape, packed into 3D arrays. For example, the 3D ordered ceramic particles may have regularly arranged pores of a hexagonal close-packed structure. As used herein, the term "monodispersed particles" refers to particles wherein at least 60% of the particles fall within a specified particle size range. For example, the monodisperse particles preferably have a diameter that deviates less than 10% in root mean square (rms), more preferably that deviates less than 5% in rms diameter.

As depicted in FIGS. 3 and 4, the 3D ordered ceramic particles 60 include a void 65 or pore 65, which may be spherical in shape. These pores 65, as well as the interstitial spaces 67 between particles 60, may align to form channels having a three-dimensional, regularly continuous structure, and these channels can advantageously distribute and/or re-distribute lithium ions in a homogenous or uniform manner throughout the separator 26 during cycling. In particular, such a structure of the coating layer 50 can allow for homogenous distribution of lithium ions, for example, in interstitial spaces 67, at the first face 65 of the first current collector 32 or at the second face 23 of the negative electrode 22 thereby preventing of dendrite formation. Furthermore, a larger amount of electrolyte 30 can infiltrate and infuse the pores 65 and interstitial spaces 67 between the ceramic particles 60 to achieve higher ionic conductivity. Thus, the diffusion of lithium ions can be controlled and high cycle characteristics can be achieved in the electrochemical cell. This homogenous distribution of lithium ions cannot necessarily be achieved with conventional separators that lack the aforementioned described coating layer because conventional separators can have an irregular pore distribution that blocks lithium ion access at the first face 65 of the first current collector 32 or at the second face 23 of the negative electrode 22.

In any embodiment, the particles 60 may have an average particle diameter of less than or equal to about 20 less than or equal to about 15 less than or equal to about 10 less than or equal to about 5 less than or equal to about 1 less than or equal to about 100 nm, less than or equal to about 50 nm, or about 10 nm; or from about 10 nm to about 20 µm, about 10 nm to about 10 µm, about 10 nm to about 5 µm, about 10 nm to about 1 µm, about 100 nm to about 20 µm, about 100 nm to about 10 µm, or about 100 nm to about 1 µm. Additionally or alternatively, the particles 60 may have an average pore size diameter (i.e., average diameter of pore 65) of less than or equal to about 500 nm, less than or equal to about 400 nm, less than or equal to about 200 nm, less than or equal to about 100 nm, less than or equal to about 75 nm, less than or equal to about 50 nm, less than or equal to about 25 nm, or about 1 nm, or about 1 nm to about 500 nm, about 1 nm to about 200 nm, about 1 nm to about 100 nm, about 1 nm to about 50 nm, about 50 nm to 500 nm, about 50 nm to about 200 nm, about 50 nm to about 100 nm, about 50 nm to about 75 nm, about 100 nm to about 500 nm, about 100 nm to about 400 nm, or about 100 nm to about 200 nm.

In any embodiment, the ceramic particles 60 may be any suitable ceramic material. For example, the ceramic particles 60 may comprise alumina ($Al_2O_3$), zirconia ($ZrO_2$), boehmite ($\gamma$-AlO(OH)), $Mg(OH)_2$, MgO, and any combinations thereof. The ceramic particles (e.g., alumina particles and zirconia particles) may be present in any phase. For example, the zirconia particles may be present in monoclinic phase, tetragonal phase, cubic phase, or a combination thereof. In any embodiment, the alumina particles may comprise crystalline $\alpha$-$Al_2O_3$ particles, $\beta$-$Al_2O_3$ particles, $\gamma$-$Al_2O_3$ particles, $\eta$-$Al_2O_3$ particles, $\theta$-$Al_2O_3$ particles, $\kappa$-$Al_2O_3$ particles, x-$Al_2O_3$ particles, $\sigma$-$Al_2O_3$ particles, or combinations thereof.

Additionally, the coating layer 50 may further comprise a polymeric binder, wherein the 3D ordered ceramic particles 60 are interspersed or intermingled with the polymeric binder. As used herein, the term "polymeric binder" includes polymer precursors used to form the polymeric binder, for example, monomers or monomer systems that can form any one of the polymeric binders disclosed above. Examples of suitable polymeric binders, include but are not limited to, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly (acrylic acid) PAA, polyimide, polyamide, sodium alginate, lithium alginate, and combinations thereof. In some embodiments, the polymeric binder may be a non-aqueous solvent-based polymer or an aqueous-based polymer. In alternative embodiments, the coating layer may not include a binder, such as a polymeric binder. In such instances, the 3D ordered porous ceramic particles may be applied and held in place via Van der Waals forces.

The coating layer 50 can be produced by known methods in the art. For example, the coating layer 50 including 3D ordered porous ceramic particles can be prepared by a method using monodispersed spherical inorganic fine particles as a template, for example, as described in M. C. Chang, *J. Korean Ceram. Soc.* 53(1) (2016), pp. 50-55, the relevant portions of which are incorporated by reference herein. Generally, a spherical polymeric template may be prepared by synthesizing monodispersed polymer spheres, for example, formed of poly(methylmetacrylate) (PMMA), polystyrene (PS), or glycidyl methacrylate (GMA). The spherical polymeric template may be combined or blended with a ceramic precursor in an organic solvent to form a slurry. The ceramic precursor may be a ceramic metal organic salt. For example, in order to prepare 3D ordered zirconia particles, the ceramic precursor may be a zirconium acetate. The organic solvent may be an alcohol, such as, methanol or ethanol. The spherical polymeric template, the ceramic precursor, and the organic solvent may be stirred for a suitable amount of time in order to ensure complete coverage of the spherical polymeric template by the ceramic precursor. Following combining, the organic solvent may be removed from the slurry, for example, via draining, suctioning, and/or drying (e.g., at or above room temperature (15° C.-25° C.), to form a dried intermediate structure (i.e., dried ceramic precursor coated spherical polymeric template). The dried intermediate structure may then be fired under an atmospheric environment at a suitable temperature (e.g., between 400° C. and 1000° C.) for a suitable amount of time (e.g., 5 hours to 20 hours) to form the 3D ordered porous ceramic particles. A person of ordinary skill in the art understands that the pore size of the 3D ordered porous ceramic particles can be controlled by appropriate selection of the particle size of the monodispersed spherical inorganic fine particles serving as a template at the time of production.

The 3D ordered porous ceramic particles can then be combined with a polymeric binder as described above and a solvent to form a slurry, which may be coated or otherwise applied to a substrate, for example, the first and/or second sides 42, 44 of the substrate 40, by any suitable method. For example, the slurry may be spread or cast onto the first and/or second sides 42, 44 of the substrate 40. Thereafter the slurry may be dried to remove the solvent and/or to complete the crosslinking or polymerization reaction by heating the substrate 40, for example, at a temperature in the range of about 30° C. to about 140° C. for about 1 minute to about 2 hours.

B. Positive Electrode

The positive electrode 24 may be formed from a first electroactive material that can sufficiently undergo lithium intercalation and deintercalation while functioning as the positive terminal of the lithium ion batteries 10, 100. The positive electrode 24 may also include a polymeric binder material to structurally fortify the lithium-based active material and an electrically conductive material. One exemplary common class of known materials that can be used to form the positive electrode 24 is layered lithium transitional metal oxides. For example, in certain embodiments, the positive electrode 24 may comprise $Li_{(1+x)}Mn_2O_4$, where $0.1 \leq x \leq 1$;

$LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0 < x < 0.2$, $y < 0.2$, and M is Al, Mg, or Ti; $LiFePO_4$, $LiMn_{2-x}Fe_xPO_4$, where $0 < x < 0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2Fe_xM_{1-x}PO_4$ (M=Mn and/or Ni, $0 \leq x \leq 1$); $LiMn_2O_4$; $LiFeSiO_4$; $LiNi_{0.6}Mn_{0.2}Co_{0.2}O_2$ (NMC622), $LiMnO_2$ (LMO), activated carbon, sulfur (e.g., greater than 60 wt % based on total weight of the positive electrode), or combinations thereof.

It is contemplated herein that the first electroactive material may be in particle form and may have a round geometry or an axial geometry. The term "axial geometry" refers to particles generally having a rod, fibrous, or otherwise cylindrical shape having an evident long or elongated axis. Generally, an aspect ratio (AR) for cylindrical shapes (e.g., a fiber or rod) is defined as AR=L/D where L is the length of the longest axis and D is the diameter of the cylinder or fiber. Exemplary axial-geometry electroactive material particles suitable for use in the present disclosure may have high aspect ratios, ranging from about 10 to about 5,000, for example. In certain variations, the first electroactive material particles having an axial-geometry include fibers, wires, flakes, whiskers, filaments, tubes, rods, and the like.

The term "round geometry" typically applies to particles having lower aspect ratios, for example, an aspect ratio closer to 1 (e.g., less than 10). It should be noted that the particle geometry may vary from a true round shape and, for example, may include oblong or oval shapes, including prolate or oblate spheroids, agglomerated particles, polygonal (e.g., hexagonal) particles or other shapes that generally have a low aspect ratio. Oblate spheroids may have disc shapes that have relatively high aspect ratios. Thus, a generally round geometry particle is not limited to relatively low aspect ratios and spherical shapes.

Additionally or alternatively, the positive electrode 24 can optionally include an electrically conductive material and/or a polymeric binder. Examples of electrically conductive material include, but are not limited to, carbon black, graphite, acetylene black (such as KETCHEN™ black or DENKA™ black), carbon nanotubes, carbon fibers, carbon nanofibers, graphene, graphene nanoplatelets, graphene oxide, nitrogen-doped carbon, metallic powder (e.g., copper, nickel, steel or iron), liquid metals (e.g., Ga, GaInSn), a conductive polymer (e.g., include polyaniline, polythiophene, polyacetylene, polypyrrole, and the like) and combinations thereof. As used herein, the term "graphene nanoplatelet" refers to a nanoplate or stack of graphene layers. Such electrically conductive material in particle form may have a round geometry or an axial geometry as described above.

Examples of suitable polymeric binders, include but are not limited to, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly(acrylic acid) PAA, polyimide, polyamide, sodium alginate, lithium alginate, and combinations thereof. In some embodiments, the polymeric binder may be a non-aqueous solvent-based polymer or an aqueous-based polymer. In particular, the polymeric binder may be a non-aqueous solvent-based polymer that can demonstrate less capacity fade, provide a more robust mechanical network and improved mechanical properties to handle silicon particle expansion more effectively, and possess good chemical and thermal resistance. For example, the polymeric binder may include polyimide, polyamide, polyacrylonitrile, polyacrylic acid, a salt (e.g., potassium, sodium, lithium) of polyacrylic acid, polyacrylamide, polyvinyl alcohol, carboxymethyl cellulose, or a combination thereof. The first electroactive material may be intermingled with the electrically conductive material and/or at least one polymeric binder. For example, the first electroactive material and optional electrically conducting materials may be slurry cast with such binders and applied to a current collector. Polymeric binder can fulfill multiple roles in an electrode, including: (i) enabling the electronic and ionic conductivities of the composite electrode, (ii) providing the electrode integrity, e.g., the integrity of the electrode and its components, as well as its adhesion with the current collector, and (iii) participating in the formation of solid electrolyte interphase (SEI), which plays an important role as the kinetics of lithium intercalation is predominantly determined by the SEI.

In any embodiment, the first electroactive material may be present in the positive electrode in an amount, based on total weight of the positive electrode, of greater than or equal to about 50 wt. %, greater than or equal to about 60 wt. %, greater than or equal to about 70 wt. %, greater than or equal to about 80 wt. %, greater than or equal to about 90 wt. %, greater than or equal to about 95 wt. %, or about 99 wt. %; or from about 50 wt. % to about 99 wt. %, about 70 wt. % to about 99 wt. %, or about 90 wt. % to about 99 wt. %.

Additionally or alternatively, the electrically conductive material and the polymeric binder each may be independently present in the positive electrode in an amount, based on total weight of the positive electrode from about 0.5 wt. % to about 20 wt. %, about 1 wt. % to about 15 wt. %, or about 1 wt. % to about 10 wt. %.

C. Current Collectors

The positive electrode current collector 34 may be formed from aluminum (Al) or any other appropriate electrically conductive material known to those of skill in the art. The first current collector 32 may comprise a metal comprising copper, nickel, or alloys thereof, stainless steel, or other appropriate electrically conductive materials known to those of skill in the art. Additionally or alternatively, the first current collector 32 may be formed of or further include a carbon or a carbon and metal (e.g., silver (Ag), aluminum (Al), zinc (Zn)) composite coating layer, for example, having a thickness of about 500 nm to about 2 µm. In certain aspects, the positive electrode current collector 34 and/or the first current collector 32 may be in the form of a foil, slit mesh, and/or woven mesh.

D. Optional Negative Electrode 22

As depicted in FIG. 2, an optional negative electrode 22 may be included in battery 100. The negative electrode 22 includes a second electroactive material as a lithium host material capable of functioning as a negative terminal of a lithium ion battery. The second electroactive material may be formed from or comprise metallic lithium. It is contemplated herein that the second electroactive material may be comprised of or consist of all metallic lithium (e.g., 100 wt. % lithium based on total weight of the first electroactive material). Additionally or alternatively, the second electroactive material may comprise a lithium alloy, such as, but not limited to, lithium silicon alloy, a lithium aluminum alloy, a lithium indium alloy, a lithium tin alloy, or combinations thereof. The negative electrode 22 may optionally further include one or more of graphite, activated carbon, carbon black, hard carbon, soft carbon, graphene, silicon, tin oxide, aluminum, indium, zinc, germanium, silicon oxide, titanium oxide, lithium titanate, and combinations thereof, for example, silicon mixed with graphite. Non-limiting examples of silicon-containing electroactive materials include silicon (amorphous or crystalline), or silicon containing binary and ternary alloys, such as Si—Sn, SiSnFe, SiSnAl, SiFeCo, and the like. In other variations, the negative electrode 22 may be a metal film or foil, such as a lithium metal film or lithium-containing foil. The second electroactive material may be in particle form and may have a round geometry or an axial geometry as described above.

Additionally, the negative electrode 22 can optionally include an electrically conductive material as described herein and/or a polymeric binder as described herein that improves the structural integrity of the electrode. For example, the second electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly(acrylic acid) PAA, polyimide, polyamide, sodium alginate, or lithium alginate, and applied to a current collector. Examples of electrically conductive material include, but are not limited to, carbon black, graphite, acetylene black (such as KETCHEN™ black or DENKA™ black), carbon nanotubes, carbon fibers, carbon nanofibers, graphene, graphene nanoplatelets, graphene oxide, nitrogen-doped carbon, metallic powder (e.g., copper, nickel, steel or iron), liquid metals (e.g., Ga, GaInSn), a conductive polymer (e.g., include polyaniline, polythiophene, polyacetylene, polypyrrole, and the like) and combinations thereof.

In various aspects, the second electroactive material may be present in the negative electrode in an amount, based on total weight of the negative electrode from about 70 wt. % to about 99 wt. %, about 80 wt. % to about 98 wt. %, about 90 wt. % to about 99 wt. %, or about 95 wt. % to about 98 wt. %. Additionally or alternatively, the electrically conductive material and the polymeric binder each may be independently present in the negative electrode in an amount, based on total weight of the negative electrode from about 0.5 wt. % to about 15 wt. %, about 1 wt. % to about 10 wt. %, or about 1 wt. % to about 5 wt. %.

E. Electrolyte

The positive electrode 24, the optional negative electrode 22, and the separator 26 may each include an electrolyte solution or system 30 inside their pores, capable of conducting lithium ions between the first current collector 32 and the positive electrode 24 or the negative electrode 22 and the positive electrode 24. Any appropriate electrolyte 30, whether in solid, liquid, or gel form, capable of conducting lithium ions between the first current collector 32 and the positive electrode 24 in the lithium-ion battery 10 or between the negative electrode 22 and the positive electrode 24 may be used in the lithium-ion battery 100. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 10.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate (LiPF$_6$), lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB(C$_2$O$_4$)$_2$) (LiBOB), lithium difluorooxalatoborate (LiBF$_2$(C$_2$O$_4$)), lithium hexafluoroarsenate (LiAsF$_6$), lithium trifluoromethanesulfonate (LiCF$_3$SO$_3$), lithium bis(trifluoromethane) sulfonylimide (LiN(CF$_3$SO$_2$)$_2$), lithium bis(fluorosulfonyl) imide (LiN(FSO$_2$)$_2$) (LiSFI), lithium (triethylene glycol dimethyl ether)bis(trifluoromethanesulfonyl)imide (Li(G3) (TFSI), lithium bis(trifluoromethanesulfonyl)azanide (LiTFSA), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane). One or more salts can be present in the electrolyte in a concentration (moles of salt per liter of solvent) ranging from greater than or equal to about 1 M, greater than or equal to about 2 M, greater than or equal to about 3 M, or about 4M, or from about 1 M to about 4 M, about 1 M to 2 M, about 2 M to about 4 M, or about 3 M to about 4 M. In any embodiment, the electrolyte can have a higher concentration of salt, for example, 3 M to about 4 M, which can further contribute to the homogenous distribution of lithium ions, for example, in pores 65 and interstitial spaces 67, at the first face 65 of the first current collector 32 or at the second face 23 of the negative electrode 22 thereby preventing of dendrite formation. Furthermore, as discussed above, a higher amount of electrolyte can infiltrate and infuse the pores 65 and interstitial spaces 67 between the ceramic particles 60 to achieve higher ionic conductivity.

Additionally or alternatively, the electrolyte may include additives, which can, for example, increase temperature and voltage stability of the electrochemical cell materials (e.g., electrolyte 30, negative electrode 22, and positive electrode 24). Examples of suitable additives include, but are not limited to, vinyl carbonate, vinyl-ethylene carbonate, propane sulfonate, and combinations therefore. Other additives can include diluents which do not coordinate with lithium ions but can reduce viscosity, such as bis(2,2,2-trifluoroethyl) ether (BTFE), and flame retardants, such as triethyl phosphate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A separator for a lithium-containing electrochemical cell comprising:
   a porous substrate having a first side and an opposing second side; and
   a coating layer disposed adjacent to at least the first side of the porous substrate, wherein the coating layer comprises three-dimensionally (3D) ordered porous ceramic particles, wherein the 3D ordered porous ceramic particles comprise monodispersed particles having pores which are aligned to form channels having a 3D continuous structure and the 3D ordered porous ceramic particles are completely ceramic, wherein the coating layer does not include a binder.

2. The separator of claim 1, wherein one or more of the following are satisfied:
   (i) the coating layer has a thickness of less than or equal to about 10 μm; and
   (ii) the 3D ordered porous ceramic particles have an average pore size diameter of less than about 500 nm.

3. The separator of claim 1, wherein one or more of the following are satisfied:
   (i) the coating layer has a thickness of about 2 μm to about 8 μm; and
   (ii) the 3D ordered porous ceramic particles have an average pore size diameter of about 100 nm to about 200 nm.

4. The separator of claim 1, wherein the 3D ordered porous ceramic particles comprise $Al_2O_3$, $ZrO_2$, γ-AlO(OH), MgO, $Mg(OH)_2$, or a combination thereof.

5. The separator of claim 1, wherein the porous substrate comprises a composite material, a polymeric material, a nonwoven material, or a combination thereof.

6. The separator of claim 5, wherein the polymeric material comprises a polyolefin.

7. An electrochemical cell comprising:
   a positive electrode comprising a first electroactive material;
   a first current collector, wherein the positive electrode is spaced apart from the first current collector;
   a separator comprising:
      a porous substrate having a first side and an opposing second side; and
      a coating layer disposed adjacent to at least the first side of the porous substrate, wherein the coating layer comprises three-dimensionally (3D) ordered porous ceramic particles, wherein the 3D ordered porous ceramic particles comprise monodispersed particles having pores which are aligned to form channels having a 3D continuous structure and the 3D ordered porous ceramic particles are completely ceramic, wherein the coating layer does not include a binder;
      wherein the separator is disposed between confronting surfaces of the positive electrode and the first current collector and the coating layer is disposed adjacent to the first current collector; and
   a liquid electrolyte infiltrating one or more of: the positive electrode and the separator.

8. The electrochemical cell of claim 7, wherein one or more of the following are satisfied:
   (i) the coating layer has a thickness of less than or equal to about 10 μm; and
   (ii) the 3D ordered porous ceramic particles have an average pore size diameter of less than about 500 nm.

9. The electrochemical cell of claim 7, wherein one or more of the following are satisfied:
   (i) the coating layer has a thickness of about 2 μm to about 8 μm; and
   (ii) the 3D ordered porous ceramic particles have an average pore size diameter of about 100 nm to about 200 nm.

10. The electrochemical cell of claim 7, wherein the 3D ordered porous ceramic particles comprise $Al_2O_3$, $ZrO_2$, γ-AlO(OH), MgO, $Mg(OH)_2$, or a combination thereof.

11. The electrochemical cell of claim 7, wherein the porous substrate comprises a composite material, a polymeric material, a nonwoven material, or a combination thereof.

12. The electrochemical cell of claim 11, wherein the polymeric material comprises a polyolefin.

13. The electrochemical cell of claim 7, wherein the electrolyte comprises a lithium salt and a solvent, wherein the lithium salt concentration is greater than or equal to about 2 M.

14. The electrochemical cell of claim 13, wherein the lithium salt concentration is about 3 M to about 4 M.

15. The electrochemical cell of claim 7, wherein the first electroactive material is selected from the group consisting of $Li_{(1+x)}Mn_2O_4$, where 0.1≤x≤1; $LiMn_{(2-x)}Ni_xO_4$, where 0≤x≤0.5; $LiCoO_2$; $Li(Ni_xMn_yCo_z)O_2$, where 0≤ x≤1, 0≤y≤1, 0≤z≤1, and x+y+z=1; $LiNi_{(1-x-y)}Co_xM_yO_2$, where 0<x<0.2, y<0.2, and M is Al, Mg, or Ti; $LiFePO_4$, $LiMn_{2-x}Fe_xPO_4$, where 0<x<0.3; $LiNiCoAlO_2$; $LiMPO_4$, where M is at least one of Fe, Ni, Co, and Mn; $Li(Ni_xMn_yCo_zAl_p)O_2$, where 0≤x≤1, 0≤y≤1, 0≤z≤1, 0≤P≤1, x+y+z+p=1 (NCMA); LiNiMnCoO$_2$; $Li_2Fe_xM_{1-x}PO_4$, where M is Mn and/or Ni, 0≤x≤1; $LiMn_2O_4$; $LiFeSiO_4$; $LiNi_{0.6}Mn_{0.2}Co_{0.2}O_2$ (NMC622), $LiMnO_2$ (LMO), activated carbon, sulfur, and a combination thereof.

16. The electrochemical cell of claim 7, wherein a negative electrode is not present.

17. The electrochemical cell of claim 7, further comprising a negative electrode comprising a second electroactive material, wherein the negative electrode is present between confronting surfaces of the coating layer of the separator and the first current collector.

18. The electrochemical cell of claim 17, wherein the second electroactive material comprises lithium, a lithium silicon alloy, a lithium aluminum alloy, a lithium indium alloy, a lithium tin alloy, graphite, activated carbon, carbon black, hard carbon, soft carbon, graphene, silicon, tin oxide, aluminum, indium, zinc, germanium, silicon oxide, titanium oxide, lithium titanate, or a combination thereof.

* * * * *